No. 722,143. PATENTED MAR. 3, 1903.
H. S. RAYMOND.
INSECT TRAP.
APPLICATION FILED OCT. 18, 1902.
NO MODEL. 2 SHEETS—SHEET 1.
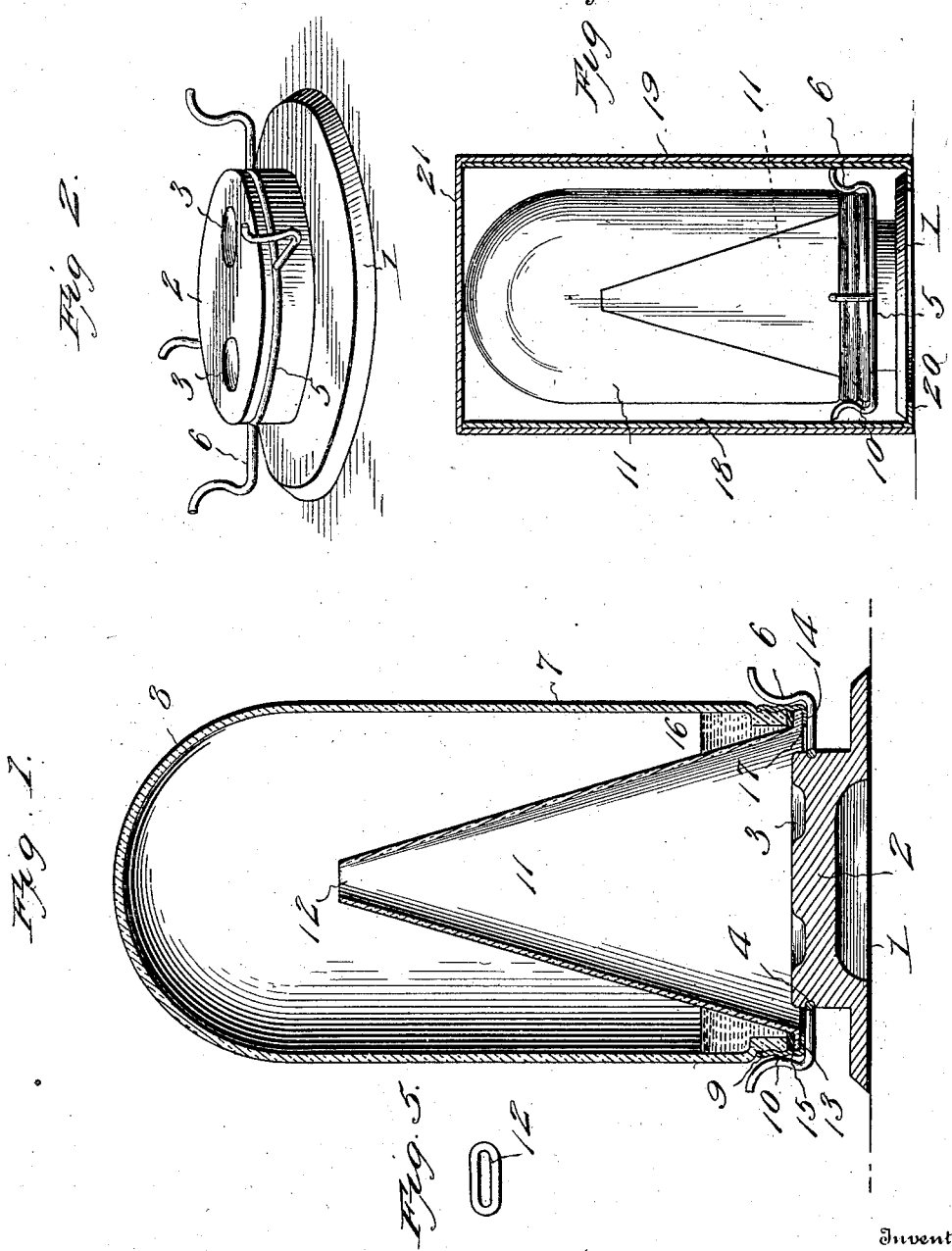
Witnesses
Inventor
Henry S. Raymond,
By Victor J. Evans
Attorney.

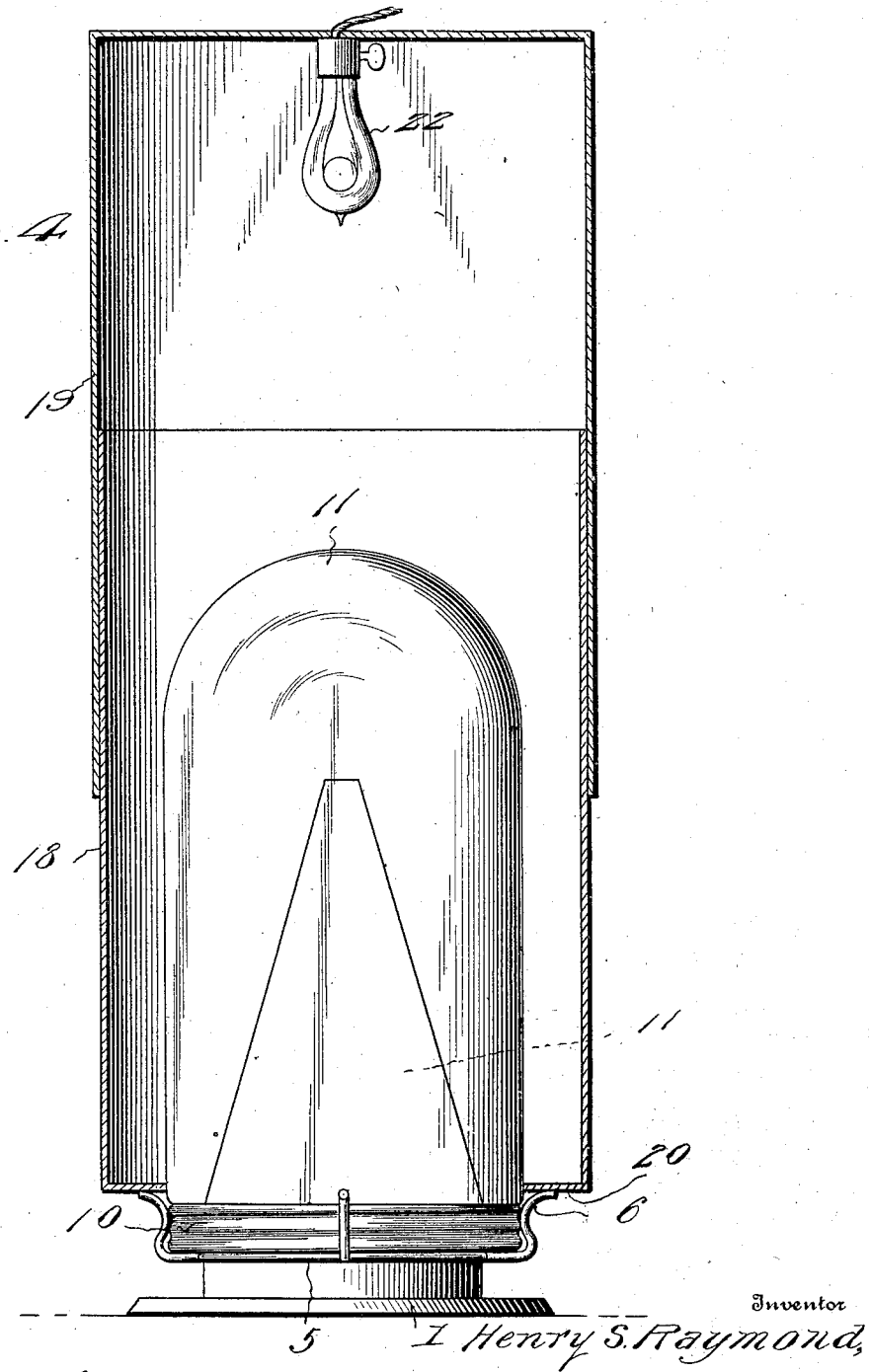

UNITED STATES PATENT OFFICE.

HENRY SUMNER RAYMOND, OF ALLIANCE, NEBRASKA.

INSECT-TRAP.

SPECIFICATION forming part of Letters Patent No. 722,143, dated March 3, 1903.

Application filed October 18, 1902. Serial No. 127,847. (No model.)

*To all whom it may concern:*

Be it known that I, HENRY SUMNER RAYMOND, a citizen of the United States, residing at Alliance, in the county of Boxbutte and State of Nebraska, have invented new and useful Improvements in Insect-Traps, of which the following is a specification.

This invention relates to insect-traps, the object in view being to provide a germ-proof trap for catching flies and other insects, the construction of which admits of the ready disassembling of the several parts, so that each and every part of the trap may be subjected to a thorough cleaning.

A further object of the invention is to so construct the trap and combine the parts thereof that poison either in the form of liquid or powder or gas may be placed in the trap and prevented from escaping. The trap is practically air and liquid tight, and thus prevents the escape of insects and germs, which can, however, be easily removed by taking the trap apart.

A further object of the invention is to combine with the trap proper a combined cover and shade forming a receptacle for the trap as well as a hood or cover adapted to be adjusted relatively to the cage proper and to contain and conceal an illuminating device of any suitable kind.

With the above and other objects in view, the nature of which will more fully appear as the description proceeds, the invention consists in the novel construction, combination, and arrangement of parts, as will be hereinafter fully described, illustrated, and claimed.

In the drawings, Figure 1 is a central vertical section through an insect-trap constructed in accordance with the present invention, showing the parts as they appear when in readiness for use. Fig. 2 is an enlarged detail perspective view of the base, including a bracket which holds the cone and receiver. Fig. 3 is a reduced sectional view showing the trap proper in elevation and the combined cover and shade in section. Fig. 4 is an enlarged view similar to Fig. 3, showing the manner of adjusting the combined cover and shade and also showing an illuminating device supported by the shade. Fig. 5 is a diagrammatic view showing the shape of the opening at the apex of the cone.

Like reference-numerals designate corresponding parts in all figures of the drawings.

The insect-trap contemplated in this invention comprises, essentially, a base 1 of any suitable size and preferably circular, the same being provided with a cylindrical or otherwise-formed extension 2, projecting above the base and provided in its upper surface with a plurality of depressions or recesses 3, forming receptacles for bait of different kinds and enabling bait of several different kinds to be placed in the trap at one time. The cylindrical or otherwise-formed portion 2 of the base is provided exteriorly with an annular groove 4, in which is received a ring 5, forming part of a bracket or holder for the receiver and cone, hereinafter described. Radiating from the ring 5 are bracket-arms 6, having their extremities upturned to properly engage and hold the other parts of the trap when placed thereon.

In carrying out the present invention I employ what I term a "receiver" 7, substantially cylindrical in shape and having by preference a hemispherical upper end 8. The receiver 7 is preferably formed of glass, which may be either plain or colored or opaque, according to the desire of the manufacturer, and the bottom of the receiver, which is open, is thickened or reinforced and somewhat reduced exteriorly and also externally threaded, as shown at 9, to be engaged by a coupling-ring 10, which joins the bottom of the receiver to the bottom of the cone, (illustrated at 11.) The cone 11 is also preferably composed of glass and is provided at its upper end or apex with a flatttened or oval-shaped opening 12, through which the flies or other insects pass in entering the receiver 7. The base of the cone 11 is provided with an outwardly-extending annular flange 13, which overlaps the bottom edge of the receiver and is secured thereto by means of the coupling-ring 10, which is also provided at its bottom edge with an inwardly-extending flange 14, which rests beneath the flange 13 of the cone. A gasket 15, of rubber or other suitable material, is inserted between the flange 13 of the cone and the bottom edge of the receiver, so that when the cone and receiver are firmly secured together by means of the coupling-ring 10 an air and water tight joint is secured between the bottom edges of the receiver and cone, thereby forming a trough or gutter 16, adapted to receive poison either in the form of liquid or powder or gas or other suitable substance, which will operate to kill the flies and other insects coming in contact therewith.

The base of the cone 11 is larger than the cylindrical or otherwise-formed extension 2 of the base, so as to leave the annular space 17, through which the flies and insects may pass in gaining access to the cone and subquently to the receiver.

The parts of the trap hereinabove described are adapted to be incased or inclosed by means of the combined cover and shade, consisting of a pair of telescopic members 18 and 19. The inner member 18 is open at both top and bottom, although the bottom is partially closed by means of an inwardly-extending flange 20, adapted when the member 18 is properly adjusted to rest upon the outwardly-projecting extremities of the bracket-arms 6, as shown in Fig. 4, thereby permitting the insects to gain access to the trap, while at the same time serving to prevent the rays of light from the illuminating device, hereinafter described, from escaping. The outer member 19 of the combined cover and shade is open at the bottom, so as to slide freely over the inner member 18, and is closed at the top, as shown at 21. The member 19 may be raised to any desired elevation, as shown in Fig. 4, and an illuminating device 22 of any suitable description may be placed within the upper portion thereof, so as to brighten and illuminate the interior of the shade and throw rays of light through the bottom of the trap, thereby attracting the insects to a point adjacent an entrance to the trap.

To take the trap apart, the receiver and cone are lifted from the base, the coupling-ring is unscrewed, and the cone and receiver separated. This gives access to all parts, which may then be thoroughly washed and cleansed, thus enabling the trap to be kept perfectly clean and sanitary. To set the trap after it has been cleaned, before screwing the cone and receiver together any suitable substance or liquid for killing the flies is placed in the receiver. The cone and receiver are then properly associated while inverted and firmly connected by means of the coupling-ring. The cone and receiver are then inverted and placed upon the base after placing the bait in the receptacles formed in the base. By agitating or shaking the trap at any time the flies may be subjected to the influence of the poison or other substances contained in the receiver without danger of spilling the same. It is sometimes found desirable to spread a blanket or sheet or the like over the trap, so as to leave the base portion of the trap exposed, whereupon the illuminating device within the combined cover and shade will attract the insects. The combined cover and shade may be composed of pasteboard or similar material.

The trap as above described effectually retains the germs, as well as dust and insects, and with proper care will last indefinitely. By cleansing the trap frequently all obnoxious smells may be avoided. The undesirable buzzing of the insects may be quickly stopped by agitating the trap and bringing the insects into contact with the poison contained in the receiver.

By reason of the water and air tight joint at the bottom of the receiver and cone insect-poison of any description may be used. By the arrangement of the combined cover and shade the trap is rendered operative and effective at night as well as in the day-time. The trap of course may be made any size and ornamented to suit the manufacturer.

It will be apparent that various changes may be made in the form, proportion, and minor details of construction, and I therefore reserve the right to make such changes as properly fall within the scope of the appended claims.

Having thus described the invention, what I claim as new, and desire to secure by Letters Patent, is—

1. An insect-trap comprising a receiver, a cone mounted therein and connected therewith, a supporting glass base provided with an annular groove, a supporting-bracket encircling the base and provided with a ring portion received in said groove, and arms radiating from the ring and adapted to embrace the bottom portion of the receiver.

2. The combination with an insect-trap, of a combined cover and shade for inclosing the same, substantially as described.

3. The combination with an insect-trap, of a combined cover and shade therefor comprising telescopic members, substantially as described.

4. The combination with an insect-trap, of a combined cover and shade provided with an opening in the bottom and having a flange extending around the opening, and having means to support the shade at a suitable elevation on the trap, substantially as described.

5. The combination with an insect-trap, of a combined cover and shade, and an illuminating device mounted within the shade.

6. The combination with an insect-trap, of a combined cover and shade comprising telescopic members adapted for relative adjustment one upon the other, and an illuminating device located within one of said members and adjustable therewith, substantially as described.

7. An insect-trap, comprising a base, a bracket supported by the base, a receiver having its lower end threaded, a cone located within the receiver and disposed over the base, an opening being formed between the latter and the lower extremity of the cone, and a coupling-ring detachably connecting the lower ends of the receiver and cone, the latter being supported by the bracket.

8. An insect-trap, comprising a base, a receiver, a cone disposed in the receiver and formed with a lower annular flange, a liquid-tight joint, means interposed between the lower extremities of the receiver and cone, and a device for separably connecting the lower ends of the receiver and cone, the said receiver and cone being supported on the base.

In testimony whereof I affix my signature in presence of two witnesses.

HENRY SUMNER RAYMOND.

Witnesses:
F. M. RAYMOND,
M. B. QUIVEY.